United States Patent

Terasaki et al.

[11] Patent Number: 5,659,534
[45] Date of Patent: Aug. 19, 1997

[54] APPARATUS FOR REPRODUCING OPTICAL INFORMATION CONTAINED DISKS OF VARIOUS RECORDING DENSITIES

[75] Inventors: Hitoshi Terasaki, Gifu-ken; Yoichi Tsuchiya; Shuichi Ichiura, both of Hashima; Osamu Ota, Gifu-ken, all of Japan

[73] Assignee: Sanyo Electric Co., Ltd., Osaka, Japan

[21] Appl. No.: 651,002

[22] Filed: May 21, 1996

Related U.S. Application Data

[63] Continuation of Ser. No. 300,646, Sep. 2, 1994, abandoned.

[30] Foreign Application Priority Data

| Mar. 18, 1994 | [JP] | Japan | 6-49040 |
| Apr. 28, 1994 | [JP] | Japan | 6-92252 |
| May 30, 1994 | [JP] | Japan | 6-116554 |
| Jul. 13, 1994 | [JP] | Japan | 6-161604 |
| Jul. 21, 1994 | [JP] | Japan | 6-169736 |
| Aug. 6, 1994 | [JP] | Japan | 6-204308 |

[51] Int. Cl.$^6$ .................. G11B 7/00; G11B 7/125
[52] U.S. Cl. .................. 369/116; 369/44.37; 369/112; 369/121
[58] Field of Search .................. 369/116, 112, 369/121, 44.26, 275.4, 275.1, 275.2, 275.3, 44.37, 54, 124

[56] References Cited

U.S. PATENT DOCUMENTS 5,016,252  5/1991  Hamada .................. 372/45
5,379,288  1/1995  Maeda .................. 369/275.4

OTHER PUBLICATIONS

Terasaki et al., "Study of High Density CD-ROM Visible Laser Pick-up", Sep. 5-8, 1993.

Fine Optical Video Disc System Specification, Prepared in Sep., 1991, revised in Jan., 1993 and Jul., 1993 by Sanyo Electric Co., Ltd. Sony Co., Ltd., Toshiba Co., Ltd, Pioneer Co., Ltd and Matsushita Denki Sangyo Co., Ltd., cover sheet and p. 12.

*Primary Examiner*—Georgia Y. Epps
*Assistant Examiner*—Kim-Kwok Chu
*Attorney, Agent, or Firm*—Sheridan Ross P.C.

[57] ABSTRACT

An apparatus is disclosed that reproduces data recorded on a recording medium having a plurality of pits formed in the medium that stores the data. The medium is designed to be compatible with an information reproducing apparatus having a lens with a first numerical aperture NA1 for focusing a laser beam of a first wavelength λ1 on the recording medium. The apparatus of the present invention comprises a laser generator for generating a laser beam of a second wavelength λ2 and a lens having a second numerical aperture NA2 for focusing the laser beam from the laser generator. The second wavelength λ2 of the laser beam and the second numerical aperture NA2 of the lens are set to satisfy the relationship: $(\lambda 2/NA2) < (\lambda 1/NA1)$.

30 Claims, 6 Drawing Sheets

Fig. 1

Prior Art

APPARATUS FOR REPRODUCING OPTICAL INFORMATION CONTAINED DISKS OF VARIOUS RECORDING DENSITIES

This is a continuation of application Ser. No. 08/300,646, filed on Sep. 2, 1994, now abandoned.

BACKGROUND OF THE INVENTION

1. Field of the Invention

The present invention relates to an optical information reproducing apparatus which reproduces information recorded on an optical disk with a laser beam. More particularly, this invention relates to an optical information reproducing apparatus which can reproduce information contained on various kinds of disks having different pit recording densities.

2. Description of the Related Art

Optical disks, such as a compact disk, a laser disk and a CD-ROM, each have many pits for recording audio data and video data. Both types of data are reproduced by accessing the pits with the reproducing optical unit (hereinafter called "pickup") of an optical information reproducing apparatus (hereinafter called "player"). The player irradiates a laser beam, generated by the pickup, along the pits while scanning a disk in the radial direction with the pickup. The pickup has a sensor to detect the pits based on the intensity of the reflected light of the irradiated laser beam.

Pits may be recesses formed in a disk. When a laser beam is irradiated on a disk region between pits, the sensor receive most of that laser beam as reflected light. When a laser beam is irradiated on the bottom of a pit, the light reflected from the bottom of the pit is dampened by the reflected light from a land portion around the pit due to the phase difference between those two reflected lights. The decrease in the intensity of the light reflected from the bottom of the pit, is detected by the sensor specifically as light from a pit area rather than from a non-pit area.

The depth of a pit (the distance between the surface of the land portion and the bottom of the pit) influences the amplitude of a reproduced signal reflected back along the incident path of the irradiated laser beam. The amplitude of the reproduced signal reaches a maximum when the degree of the cancellation of the reflected light from the pit is maximized. This maximum cancellation occurs when light is reflected from pits having a depth of $\lambda/4n$ with a phase difference of $\pi$. As used here, "$\lambda$" is the wavelength of a semiconductor laser beam produced by the pickup and "n" is the refractive index of the material of the optical disk with respect to the laser beam having the wavelength $\lambda$ (n being about 1.58 for polycarbonate).

A push-pull type tracking servo system is commonly known as one type of tracking servo system that can trace a row of pits with the pickup. The pit detection by this push-pull tracking servo system however does not work when the pit depth is $\lambda/4n$. This is due to the way the push-pull type tracking servo system dampens the intensity of the reflected light. When light is reflected from a pit having a $\lambda/4n$ depth, the difference between the intensity of the reflected light from a pit and that of the reflected light from a land portion (which is converted into a tracking signal) becomes zero. When the intensity of the reflected light is zero, there is effectively no tracking signal for the servo system to obtain. Consequently, the push-pull type of tracking servo system would be unable to compensate for any deviation to the laser beam.

In view of the above, ordinary disks are so designed that the depth of pits is slightly shallower than $\lambda/4n$. For example, with disks of this type, the amplitude of the reproduced signal can be maximized using lasers producing beams having a wave length $\lambda$ of 633 nm. Other commonly available players are designed to reproduce data from disks having laser beams that utilize wavelengths $\lambda$ of 830 nm. With the laser type of laser beam, the depth of pits may be as shallow as 633/830 $(0.76) \times \lambda/4n$. This ensures the push-pull type beam tracking control.

The beam wavelength $\lambda$ of a laser equipped in the pickup and the numerical aperture NA of an objective lens are determined in accordance with the packing density of a disk. When disks having a high packing density are used, it is necessary to reduce the size of the laser beam spot in order to improve the resolution of the optical pickup. In general, the beam spot size is proportional to the wavelength $\lambda$ of the beam and is inversely proportional to the numerical aperture NA of the objective lens. Generally, therefore, a pickup having a short wavelength $\lambda$ and a large numerical aperture NA is used to reproduce data from a disk with a high packing density. Likewise, a pickup having a long wavelength $\lambda$ and a small numerical aperture NA is used to reproduce data from a disk with a low packing density.

This is common for example with CD-ROMs having digital data recorded by EFM (Eight to Fourteen Modulation). The pickup used in this type of CD-ROM utilize standardized laser generators that produce beams with a wave length of 780 nm. In addition, the objective lenses in these devices have a numerical aperture of 0.45.

Most recently, the trend in laser optics has been to decrease the oscillation wavelength of lasers used to reproduce data from optical disks. Laser generators have been developed which produce wavelengths shorter than 780 nm. Corresponding attempts to improve the packing density of optical disks have sought to take advantage of this tendency toward the increasingly smaller wavelengths.

It would be desirable, for example, that players designed to handle disks having a high packing density be able to reproduce data from disks having normal packing density (e.g., those having a recording linear velocity of 1.4 m/s and a track pitch of 1.6 µm). Currently, disks utilizing normal packing density are produced to be compatible with pickups of players specifically designed for those types of disks. Should a player, designed to reproduce data from a disk having a high packing density, be used to reproduce data from a disk having a normal packing density, the reproduced signal would most certainly exhibit poor signal characteristics.

SUMMARY OF THE INVENTION

Accordingly, it is a primary objective of the present invention to provide an optical information reproducing apparatus that can obtain a reproduced signal having a particular desired characteristic from a disk having the normal packing density, as well as from a disk having a packing density higher than the normal packing density.

To achieve the foregoing and other objects and in accordance with the purpose of the present invention, an improved optical information reproducing apparatus is provided.

This apparatus reproduces data recorded on a recording medium using a laser beam. The recording medium has a plurality of pits, arranged on the recording medium, for storing data, and is designed to be adaptable for an information reproducing apparatus having a lens with a first numerical aperture NA1 for focusing a laser beam of a first wavelength $\lambda 1$ on the recording medium. The apparatus of the present invention comprises a laser generator for generating a laser beam of a second wavelength λ2 and a lens having a second numerical aperture NA2 for focusing the laser beam from the laser generator. The second wavelength λ2 of the laser beam and the second numerical aperture NA2 of the lens are set to satisfy an equation below:

$$(\lambda 2/NA2) < (\lambda 1/NA1).$$

According to the reproducing apparatus of the present invention, the spot size of a laser beam on a recording medium can be made smaller to improve the pit detecting performance. This apparatus uses a wavelength different from the wavelength used to reproduce data from a recording medium having the normal packing density. This allows the amplitude of a reproduced signal to be increased. The signal characteristic of the data reproduced by the reproducing apparatus of the present invention therefore becomes virtually equal to the signal characteristic of data reproduced by a reproducing apparatus specifically designed for that recording medium.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENT

FIRST EMBODIMENT

Figure 2:
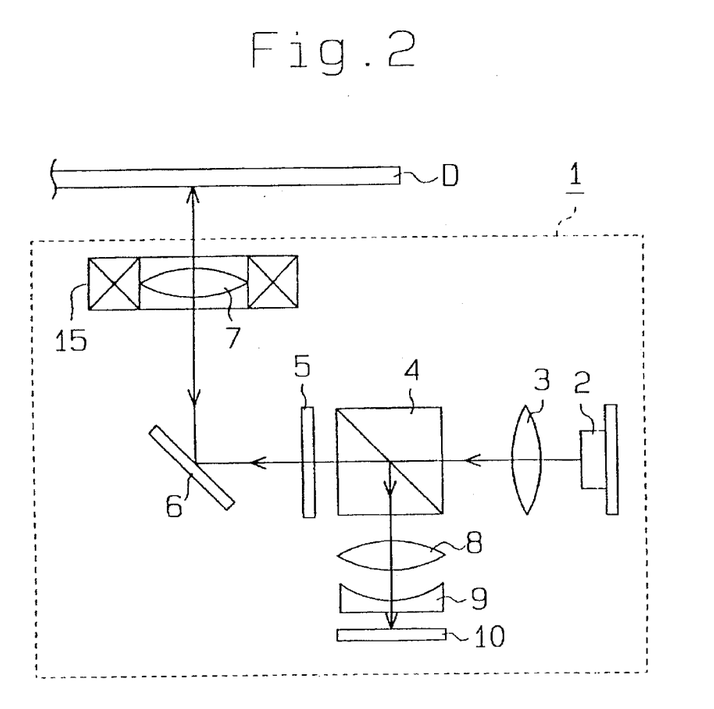
FIG. 2 is a schematic diagram showing the reproducing optical system of an optical information reproducing apparatus according to the present invention.

An optical information reproducing apparatus according to one embodiment of the present invention will now be described referring to the accompanying drawings. FIG. 2 shows a pickup 1 which constitutes the reproducing optical system included in the optical information reproducing apparatus.

The pickup 1 comprises a semiconductor laser generator 2, a collimating lens 3 and an objective lens 7. The laser generator 2 emits a laser beam of a wavelength λ2 (about 635 nm in this embodiment) toward the lens 3. The collimating lens 3 converts the laser beam from the laser generator 2 into parallel light. The parallel light enters the objective lens 7 having a numerical aperture NA2 (=0.6 in this embodiment) via a beam splitter 4, a ¼ wave plate 5 and a reflecting mirror 6. The objective lens 7 focuses the laser beam to form a beam spot on the surface of a compact disk D as an optical disk. The reflected light from the disk D is guided to the beam splitter 4 via the reflecting mirror 6 and ¼ wave plate 5. The beam splitter 4 splits the reflected light so that one part travels toward an objective lens 8. The split and reflected light is converted to a beam having an astigmatism of 0 by the objective lens 8 and a cylindrical lens 9. This beam is then received by a sensor 10 having light-receiving elements. The pickup 1 further comprises an actuator 15 for moving the objective lens 7 along the optical path.

Figure 1:
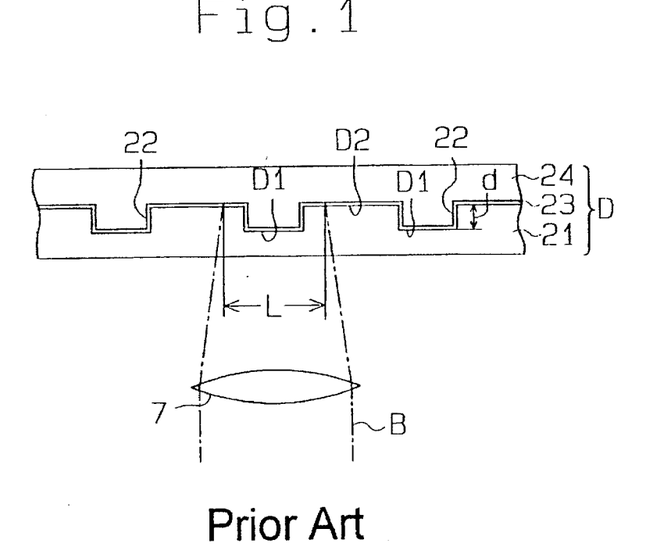
FIG. 1 is an exemplary diagram showing the principle of reproducing data recorded on a compact disk.

A description will now be given of the principle of reproducing data recorded on the compact disk D. As shown in FIG. 1, the compact disk D has a disk substrate 21 of polycarbonate, which has a plurality of recesses (called "pits") 22 arranged on one surface of the substrate 21. The pit-formed surface is covered with a thin reflection film 23 formed by vapor deposition of aluminum. This reflection film 23 is covered with a resin based protection film 24.

A laser beam spot L from the objective lens 7 reflects off of the bottom of the reflection film 23 of the compact disk D. The reproducing apparatus reproduces digital data based on a change in the intensity of the reflected light from the reflection film 23. Most of a laser beam B, gets irradiated over an area that contains no pits D1 (i.e., an area between pits). This portion of the laser beam is reflected and travels back along the incident light path with an increase in intensity from that originally generated by the laser. Sensor 10 can in this way detect increases made in the reflected light.

When the laser beam spot B is irradiated on an area containing a pit D1, a phase difference occurs between the reflected light from the bottom of the pit D1 and the reflected light from the surface of a land portion D2 around pit D1. Consequently both reflected light components tend to dampen each other's intensity. Consequently, the sensor 10 detects the reflected light having a weak intensity.

As mentioned above, the intensity of the reflected light in the case of irradiating a laser beam on an area containing a pit D1 differs from that of the reflected light in the case of irradiating a laser beam on a land area between pits. It is therefore possible to reproduce digital data recorded as pits D1 on the compact disk D by detecting a change in the intensity of the reflected light.

Figure 3:
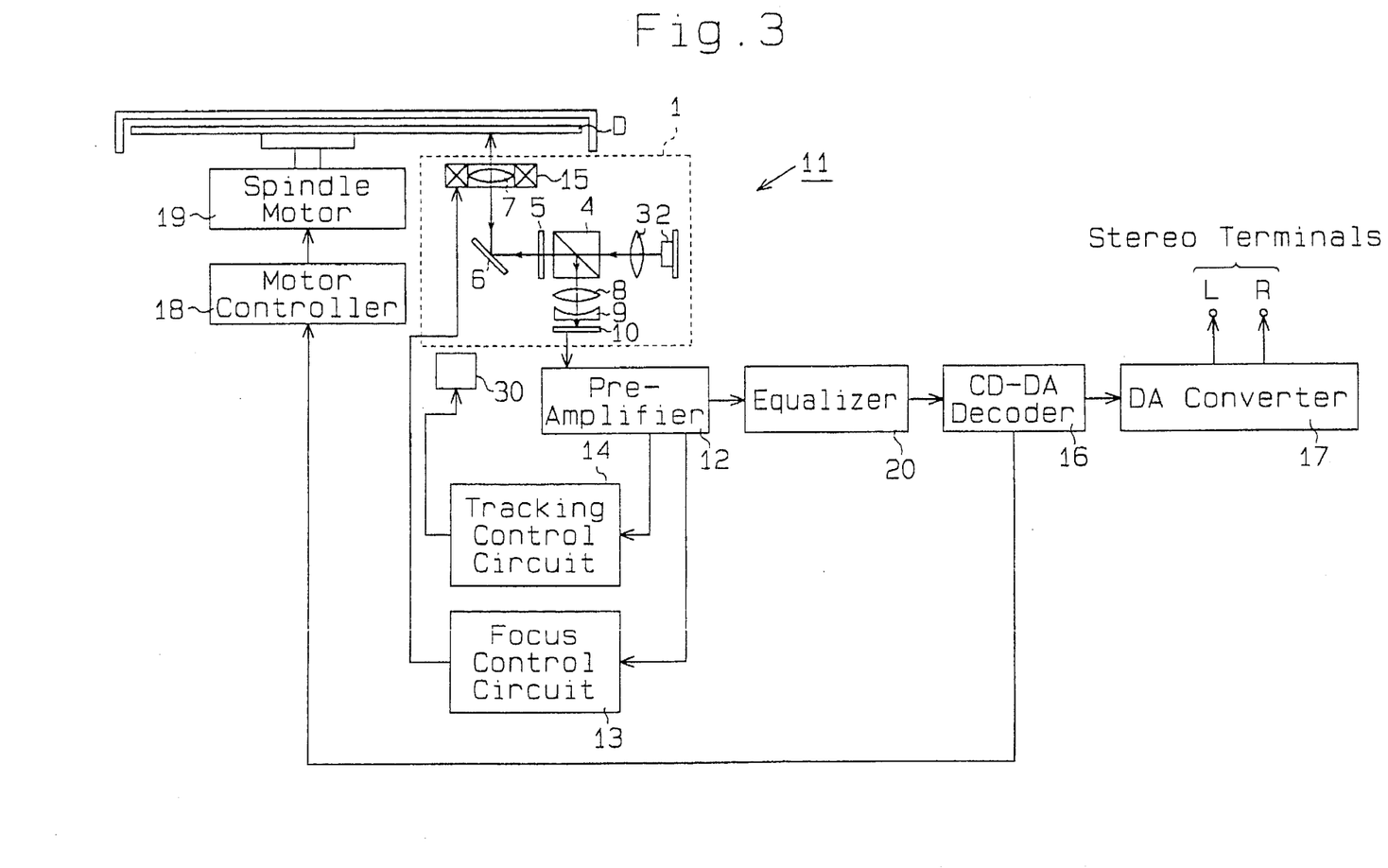
FIG. 3 is a block diagram showing the electric structure of the optical information reproducing apparatus according to the present invention.

FIG. 3 shows the electric structure of a player 11 as an optical information reproducing apparatus. The sensor 10 of the pickup 1 provides a reproduction output based on the received reflected light. The output signal from the sensor 10 is amplified by a preamplifier 12 and the amplified signal is input to a focus control circuit 13 and tracking control circuit 14. Based on the signal from the amplifier 12, the focus control circuit 13 controls a first actuator 15 to adjust the position of the objective lens 7. Based on the signal from the amplifier 12, the tracking control circuit 14 controls a second actuator 30 to accomplish the tracking servo of the laser beam.

The reproduction output from the preamplifier 12 is also input to a compact disk-digital audio (CD-DA) decoder 16 via an equalizer (reproduction RF circuit) 20.

The equalizer 20 adjusts the amplitude of the reproduced signal in such a manner that the amplitude of the reproduced signal for the shortest pit becomes equal to that of the reproduced signal for the longest pit. The equalizer 20 also compensates the reproduced signal so that this signal has a predetermined frequency characteristic.

The CD-DA decoder 16 performs EFM or a de-interleaving process on the received signal and outputs the decoded output to a DA converter 17. The DA converter 17 converts the decoded output into a 2-channel audio signal.

The CD-DA decoder 16 outputs a frame sink signal of 7.25 KHz, obtained by EFM, to a motor controller 18 as a detection signal representing the rotation of an optical disk. The motor controller 18 compares the phase of a reference signal to keep the linear velocity of the laser beam at the reading position constant with the phase of the frame sink signal. The controller 18 then controls the rotation of a spindle motor 19, based on the comparison result.

Given a compact disk having a compatible with a pickup having a laser generator using a wavelength $\lambda 1$ and an objective lens with a numerical aperture NA1. Data reproduction from the compact disk, using the pickup 1 according to this embodiment which includes a laser generator having a wavelength $\lambda 2$ and an objective lens having a numerical aperture NA2 ($\lambda 2/NA2<\lambda 1/NA1$), will be described below.

(1) Push-pull Type Tracking Signal

The amplitude value of a reproduced signal reaches a maximum when the pit depth is $\lambda/4n$. The push-pull type of tracking servo, however, will not work well with pit depths of $\lambda/4n$ as mentioned earlier. Consequently, the depth d of the pit D1 is set to about $633/830\times\lambda/4n$ or $0.76\times\lambda/4n$.

Suppose that a laser beam having the wavelength $\lambda 2$ ($\neq \lambda 1$) is irradiated on the pit D1 whose depth d is $0.76\times\lambda/4n$. Since the tracking signal should be detected even if the wavelength is $\lambda 2$, $\lambda 2/4n$ should be greater than at least $0.76\times\lambda 1/4n$. Thus, the wavelength $\lambda 2$ must satisfy the relation given by the following equation (1).

$$0.76\times\lambda 1 < \lambda 2 \tag{1}$$

(2) Beam Spot Size

Figure 4:
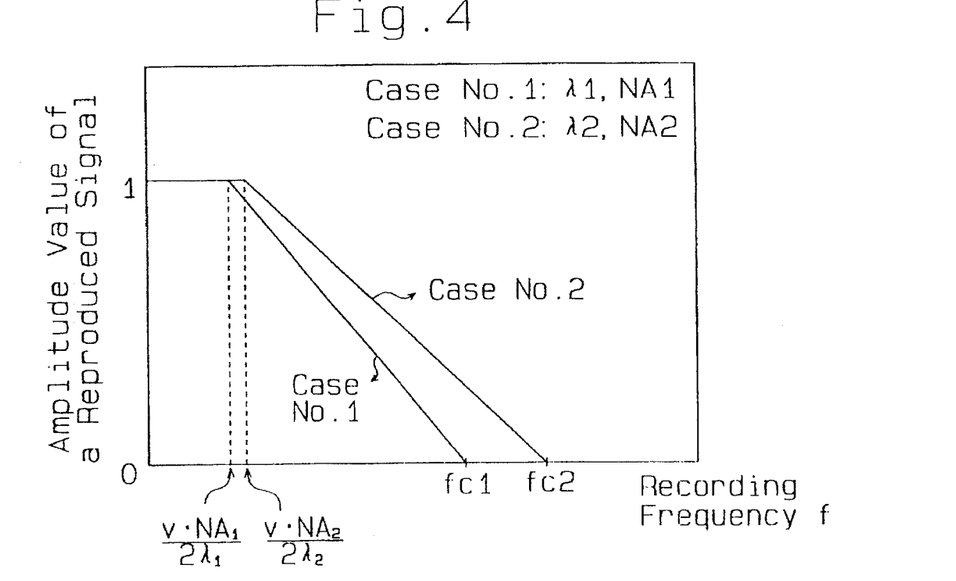
FIG. 4 is a graph showing the relationship between the reproducing frequency and the relative amplitude of a reproduced signal for two cases where the wavelength of a reproduction laser and the numerical aperture of an objective lens vary.

The spot size of the laser beam focused on the pits-formed area on the disk is proportional to the wavelength of the laser beam and is inversely proportional to the numerical aperture of the objective lens. For the same pit width, therefore, the amplitude of a reproduced signal in case 1, with the wavelength $\lambda 1$ and the numerical aperture NA1, differs from that of a second case 2, where for example the wavelength is $\lambda 2$ and when the numerical aperture is NA2, as shown in FIG. 4. In FIG. 4, the horizontal scale represents the recording frequency f with "fc1" and "fc2" being set as cutoff frequencies represented by equation (2) below. The recording frequency f is the number of pits that a laser beam passes over given a particular linear velocity per unit time.

$$fci=2\times v\times NAi/\lambda i \; (i=1, 2) \tag{2}$$

Here, "v" is the linear velocity at which the laser beam spot moves along a line of pits.

The pickup 1, utilizing wavelength $\lambda 2$ and numerical aperture NA2 scans the pits on the disk at a certain recording frequency f, and generates a reproduced data signal. The amplitude of the reproduced signal can be represented as a relative value I1, where I1 represent a ratio of amplitudes of signals reproduced using wavelength $\lambda 2$ and numerical aperture NA2 as well as the wavelength $\lambda$ and numerical aperture NA2. This is also expressed by the equations (3), (4) or (5) in accordance with the value of the recording frequency f.

When f is smaller than $(v\times NA1)/(2\times\lambda 1)$, $$I1=1 \tag{3}$$

When f is between $(v\times NA1)/(2\times\lambda 1)$ and $(v\times NA2)/(2\times\lambda 2)$, $$I1=3/\{2\times[2-(\lambda 1\times f)/(v\times NA1)]\} \tag{4}$$

When f is greater than $(v\times NA2)/(2\times\lambda 2)$, $$I1=[2-(\lambda 2\times f)/(v\times NA2)]/[2-(\lambda 1\times f)/(v\times NA1)] \tag{5}$$

The relative value I1 suggests the rate at which the amplitude value of the reproduced signal should change as the length of the pits (or the recording frequency f) changes.

Figure 5:
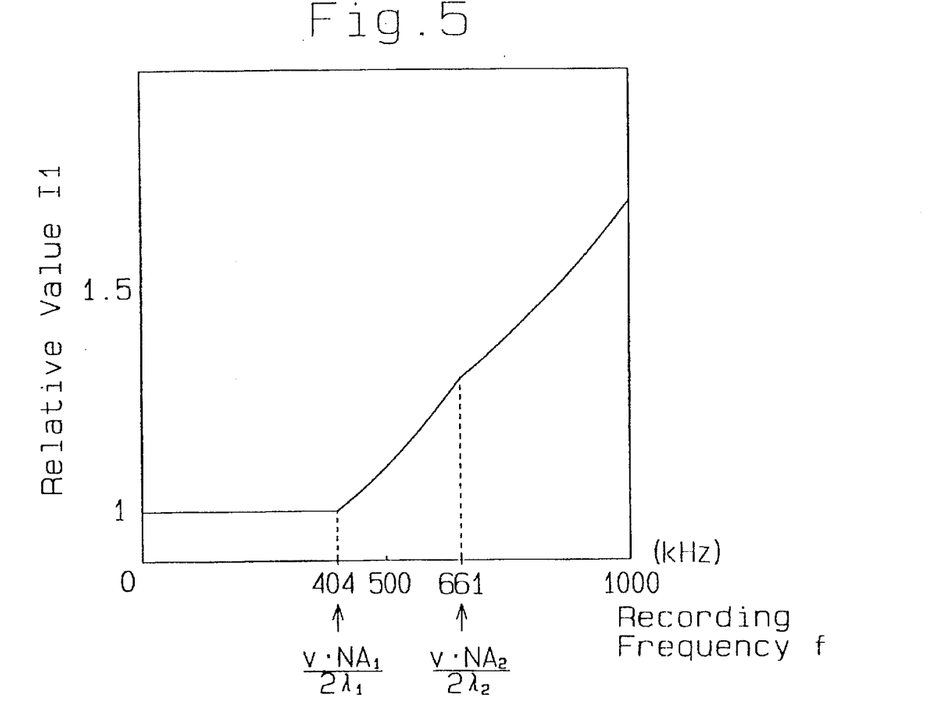
FIG. 5 is a graph exemplifying a change in the relative amplitude of a reproduced signal as the spot size of a reproducing beam decreases.

Given a normal packing density compact disk compatible with a pickup having a laser generator using a wavelength $\lambda 1=780$ nm and an objective lens with a numerical aperture NA1=0.45. The pickup utilizing $\lambda 1$ and NA1 can generate a first reproduced data signal, while the pickup 1 utilizing $\lambda 2$ and NA2 can generate a second reproduced data signal, when the pickup 1 scans the pits on the normal packing density. FIG. 5 shows the relative value I1 calculated by dividing an amplitude value of the second reproduced signal by an amplitude value of the first reproduced signal. Accordingly, the relative value I1 suggests how times is the amplitude of the signal generated by the pickup 1 greater than that of the signal generated by the conventional pickup.

Since the maximum recording frequency for existent compact disks is set to 720 KHz, the recording frequency f in this embodiment is set equal to or lower than 1000 KHz. As shown in FIG. 5, as the recording frequency increases, the amplitude value obtained by the data reproduction by the pickup 1 according to this embodiment increases in comparison with that obtained by the data reproduction by the pickup with $\lambda 1$ and NA1.

If a decrease in the spot size of the beam focused on the pits occurs, due to the condition that $(\lambda 2/NA2)<(\lambda 1/NA1)$, and if the target pits for reproduction have the same width, then the amplitude of the reproduced signal for the case 1 with the wavelength $\lambda 1$ and the numerical aperture NA1 differs from that for the case 2 with the wavelength $\lambda 2$ and the numerical aperture NA2.

Figure 6:
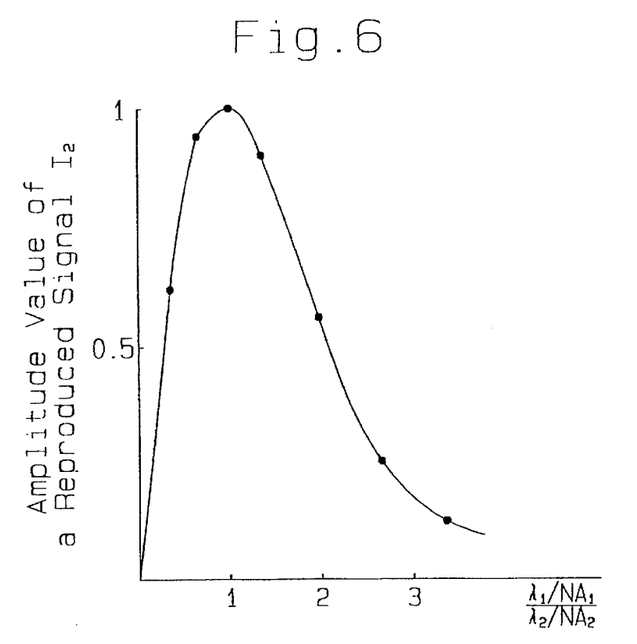
FIG. 6 is a graph which illustrates the change in the amplitude of a reproduced signal when deviations are made in the optimal value of a disk's pit width and when the spot size of a reproducing beam decreases.

FIG. 6 shows a reproduced amplitude value I2 when data from a disk having a pit width designed to provide a reproduced signal having the optimal amplitude under the condition of the wavelength $\lambda 1$ and numerical aperture NA1, is in fact reproduced under a different condition ($\lambda 2/NA2$). This reproduced amplitude value I2 indicates a change in the amplitude of the reproduced signal when the pit width changes. Equation (6) describes the reproduced amplitude value I2, approximated for a maximum value of "1".

$$I2=\sin^2\{\pi/2\times(\lambda 2/NA2)/(\lambda 1/NA1)\} \tag{6}$$

(3) Shift of the Phase Difference from the Optimal Value

The intensity of the reproduced signal depends on the phase difference between the reflected light from the area containing the pit D1 and the reflected light from the land portion D2. When the laser beam with a wavelength $\lambda$ is irradiated on the pit D1 having a depth d, the waveform of the reproduced signal is given by the following equation (7).

$$\sin(2\pi n/\lambda \cdot x) + \sin(2\pi n/\lambda \cdot (x+2d)) = 2\sin(2\pi n/\lambda \cdot (x+d)) \cdot \cos(2\pi n d/\lambda) \quad (7)$$

Thus, the intensity of the reproduced signal is proportional to the following equation (8).

$$1 - \cos^2(2\pi n d/\lambda) \quad (8)$$

When a laser beam having a wavelength $\lambda = \lambda 2$ is used to access the pit D1 having a depth $d = 0.76 \times \lambda 1/4n$ as mentioned earlier, the amplitude value I3 of the reproduced signal becomes as expressed by the following equation (9).

$$I3 = a \cdot (1 - \cos^2(0.76 \times \pi/2 \times \lambda 1/\lambda 2)) \quad (9)$$

where a is a constant. I3 shows a change in the amplitude value of the reproduced signal when the pit depth changes. When I3 is set equal to "1", as is the case with a laser beam having the wavelength $\lambda 1$, the reproduction of disk data using a laser beam having a wavelength $\lambda = \lambda 2$ requires the constant "a" to be 1.16.

The pickup 1, utilizing wavelength $\lambda 2$ and numerical aperture NA2 scans the pits on the normal density disk, and generates a reproduced data signal. The amplitude of the reproduced signal can be represented as a relative value I expressed by the following equation (10), with respect to the amplitude of a reproduced signal from the disk by a conventional pickup utilizing wavelength $\lambda 1$ and numerical aperture NA1.

$$I = I1 \times I2 \times I3 \quad (10)$$

Here $$I2 = \sin^2[\pi/2 \times (\lambda 2/NA2)/(\lambda 1/NA1)] \quad (6)$$

$$I3 = [1 - \cos^2(\pi/2 \times 0.76 \times \lambda 1/\lambda 2)] \times 1.16 \quad (9)$$

When f is smaller than $(v \times NA1)/(2 \times \lambda 1)$, $$I1 = 1 \quad (3)$$

When f is between $(v \times NA1)/(2 \times \lambda 1)$ and $(v \times NA2)/(2 \times \lambda 2)$, $$I1 = 3/\{2 \times [2 - (\lambda 1 \times f)/(v \times NA1)]\} \quad (4)$$

When f is greater than $(v \times NA2)/(2 \times \lambda 2)$, $$I1 = [2 - (\lambda 2 \times f)/(v \times NA2)]/[2 - (\lambda 1 \times f)/(v \times NA1)] \quad (5)$$

Given a normal packing density compact disk standardized to be accessed at the reproducing linear velocity $V=1.4$ m/s, with the conventional pickup having a laser generator using the wavelength $\lambda 1=780$ nm and an objective lens with the numerical aperture NA1=0.45. Data reproduction from the standard disk, using the pickup 1 according to the present invention (the wavelength $\lambda 2=635$ nm; numerical aperture NA2=0.6), will be described below.

In this case, the recording frequency f lies between the lowest frequency fL=196 KHz and the highest frequency fH=720 KHz.

Generally, compact disks incorporate the following specifications respecting the amplitude of the reproduced signal.

$$0.3 \leq IfH/Itop \leq 0.7$$

$$IfL/Itop \geq 0.6$$

Here,

Itop is the difference between the level used to provide the maximum quantity of light and the 0 level at the time of reproducing a fL signal;

IfH is the difference between the amplitude value and the level used to provide the maximum quantity of light at the time of reproducing a fH signal; and IfL is the difference between the amplitude value and the level used to provide the maximum quantity of light at the time of reproducing a fL signal.

The reproduced signals from conventional disks commonly available on the market have the characteristics such that IfH/Itop is about 0.3 to 0.4 and IfL/Itop is about 0.8. Equations (11) and (12) describe the conditions for the range of relative value I of the signal reproduced by the pickup 1 (the wavelength $\lambda 2=635$ nm and the numerical aperture NA2=0.6) with respect to the signal reproduced by the ordinary pickup (the wavelength $\lambda 2=780$ nm and the numerical aperture NA2=0.45).

$$I \geq 1 \quad \text{(when } f=fH\text{)} \quad (11)$$

$$I \geq 0.75 \quad \text{(when } fH > f \geq fL\text{)} \quad (12)$$

With the pickup 1 having the wavelength $\lambda 2=635$ nm and the numerical aperture NA2=0.6, then I=1.01 at the frequency f=fH=720 KHz, and I=0.77 at the frequency f=fL=196 KHz. Those values of I which satisfy the equations (11) and (12) allow data to be reproduced from a compact disk with the normal packing density without problems.

The inventors produced a prototype of a player that can reproduce data from a CD-ROM having a packing density four times greater than the normal one, using the pickup which is equipped with a laser generator whose wavelength is 635 nm and the objective lens whose numerical aperture is 0.6. A disk having a packing density four times greater than the normal one has EFM data recorded at the recording linear velocity V of 0.7 m/s and the track pitch of 0.85 μm. The prototype player reproduces data from this high-density disk at the linear velocity V of 2.8 m/s. It is therefore understood that the pickup 1 is compatible with data reproduction from disks having a normal to a four-fold packing density.

Figure 7:
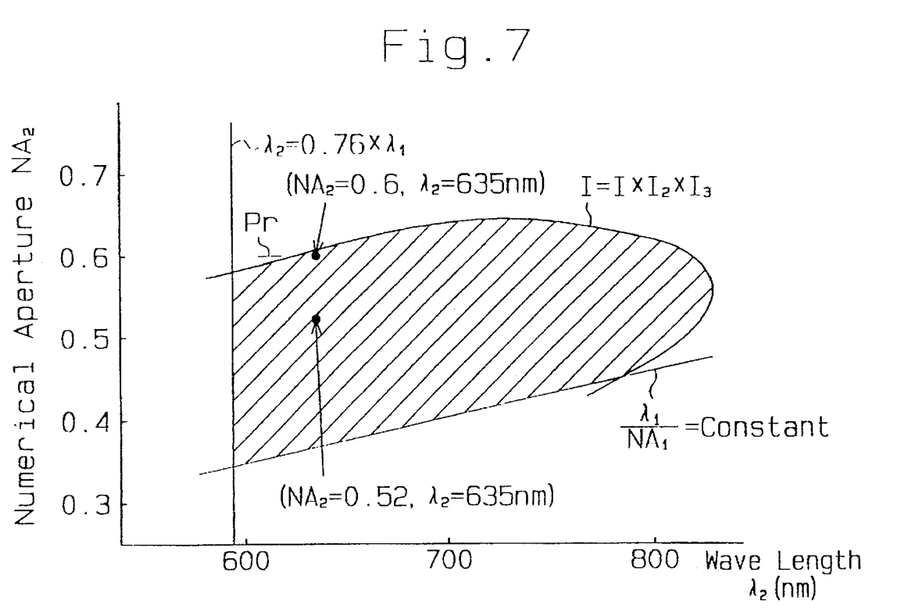
FIG. 7 is a graph showing a range of combinations of the laser wavelengths and the numerical apertures of an objective lens which satisfy certain operating conditions of the present invention when it is used to reproduce data from a compact disk.

FIG. 7 shows the relationship between the wavelength $\lambda 2$ and the numerical aperture NA2 in the pickup 1 according to the present invention, and suggests the optimal area of the combination of the $\lambda 2$ and NA2 when the pickup 1 is used to scan a compact disk designed to be accessed at the reproducing linear velocity of V=1.4 m/s with a conventional pickup utilizing a laser generator with the wavelength $\lambda 1=780$ nm and an objective lens with the numerical aperture NA1=0.45.

When the combination of the numerical aperture NA2 and wavelength $\lambda 2$ falls within the shaded range as shown in FIG. 7, the push-pull type tracking signal can be obtained and the spot size of the laser beam can be reduced. This increases the amplitude of the reproduced signal, and prevents its amplitude from being reduced due to the deviation of a real phase difference from the desired phase difference (i.e., the deviation of a real depth of each pit from a designed depth).

Even when a signal is reproduced from a disk having the normal packing density with the pickup 1 (numerical aperture NA2 and wavelength $\lambda 2$) which satisfies the aforementioned conditions ($\lambda 2/NA2 < \lambda 1/NA1$, equation (1), (11) and (12)), the reproduced signal has about the same characteristic as that provided by the pickup which is equipped with a laser generator having the wavelength $\lambda 1$ and an objective lens having the numerical aperture NA1.

This pickup 1 can reproduce data not only from a high-density disk, but also from a standardized disk designed to be accessed by a pickup having a laser generator with a wavelength λ1 and an objective lens with a numerical aperture NA1, without problem.

Incidentally, U.S. Pat. No. 5,016,252 discloses a buried type rich stripe laser whose wavelength is λ2=635 nm. The wavelength λ of this laser can easily be changed to a range of about 610 to 665 nm. It is known that the wavelength λ of this laser also varies with a change in temperature. In the case where data is reproduced with a pickup having a laser generator with a wavelength of 610 to 665 nm and an objective lens with a numerical aperture of 0.6, it is apparent from the line Pr in FIG. 7 that a laser generator having a wavelength of 610 to 620 does not satisfy the conditions of this embodiment. A buried type rich stripe laser whose wavelength is 621 nm or longer satisfies the conditions of this embodiment and can provide a reproduced signal having the desired characteristics.

SECOND EMBODIMENT

A second embodiment of the present invention will now be described. In this embodiment, the pickup 1 has a wavelength λ2 of 635 nm and a numerical aperture NA2 of 0.52. λ2=635 nm and NA2=0.52 fall within the shaded area shown in FIG. 7. With λ2=635 nm and NA2=0.52, I=1.14 at the frequency f=fH=720 kHz and I=0.92 at f=fL=196 kHz according to the aforementioned equations (3) to (5), (6) and (9). Those values of I satisfy the conditional equations (11) and (12) explained in the foregoing description of the first embodiment. Therefore, data on a compact disk with the normal packing density can be reproduced without any problems using the pickup which has λ2=635 nm and NA2=0.52 as per the first embodiment (λ2=635 nm and NA2=0.6).

The following will discuss how the value of the numerical aperture NA2 of the pickup 1 in this embodiment has been set to 0.52.

Figure 8:
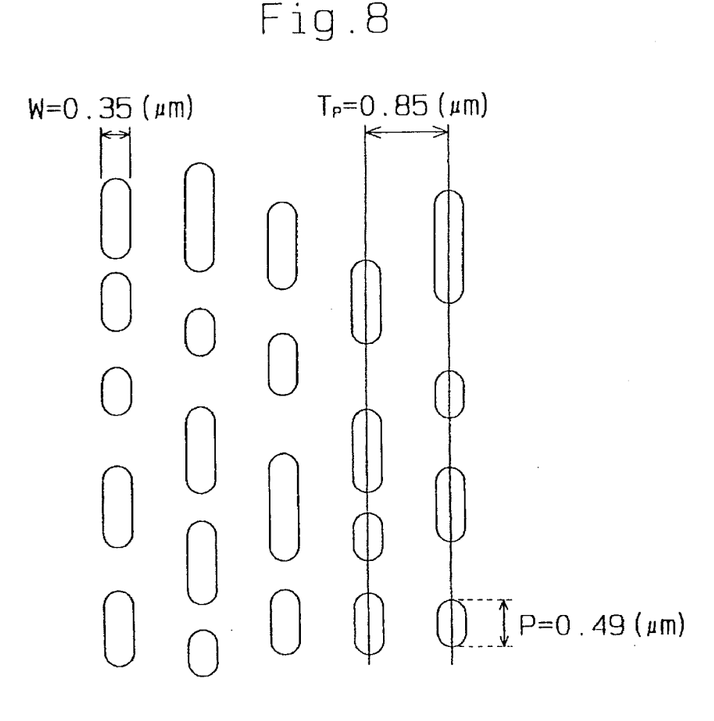
FIG. 8 is a schematic view illustrating the pits of a disk with a four-fold packing density.

Pits are formed in a disk with a four-fold packing density according to data that is to be recorded on this disk, as shown in FIG. 8. The length of the shortest pit, P, in EFM (Eight to Fourteen Modulation) mode is 0.49 μm. The width of the pit, W, is 0.35 μm, the track pitch Tp is 0.85 μm and the recording linear velocity is 0.7 m/s. Since the allowable range for the recording linear velocity is between 0.6 m/s to 0.7 m/s, the length P of the shortest pit should range from 0.42 (≈0.416) μm to 0.49 μm.

Figure 9:
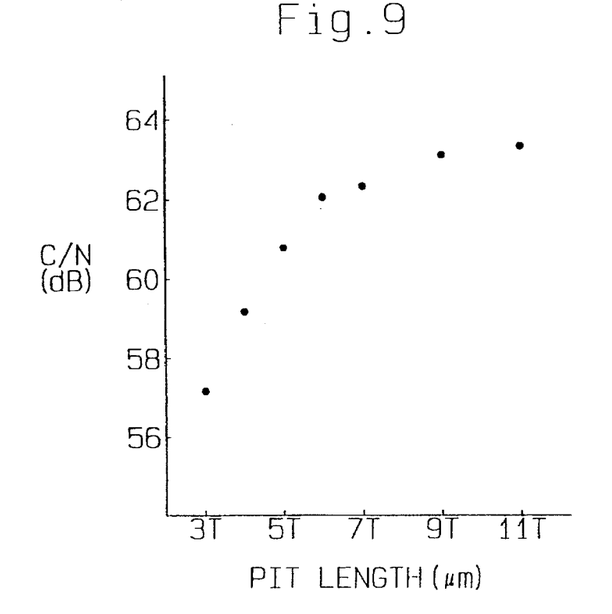
FIG. 9 is a graph of the characteristic of C/N ratio of a reproduced signal from the disk with a four-fold packing density.

Generally, the C/N (Carrier wave to Noise) ratio of a reproduced signal from a disk is given by the following equation (13).

$$X(dB)=20 \log_{10} C/N \qquad (13)$$

where C is the amplitude of the reproduced signal and N is the amplitude of noise. With λ2=635 nm and NA2=0.60, when a disk with a four-fold packing density is played back at the linear velocity of 2.8 m/s, the C/N ratio (the value of X in the equation (13)) for the longest pit (indicated by "11T" in FIG. 9) is 63.0 dB as shown in FIG. 9. In this diagram, "T" represents the basic period of the clock. With X=63.0 and C=1 as the amplitude of the reproduced signal from the longest pit (11T) in the equation (13), N=1/1412.54.

Using this value of N, the amplitude C of the reproduced signal from the shortest pit (3T) is obtained from the following equation (14).

$$C=10^{X/20}/1412.54 \qquad (14)$$

With regard to an optical disk, normally, if the C/N ratio of the reproduced signal from the shortest pit is about 50 dB,
the reproduced signal can have a sufficient quality. With X=50 dB in the above equation (14), C=0.22. This value of C indicates the ratio of the amplitude of the reproduced signal from the shortest pit (3T) to the amplitude (C=1) of the reproduced signal from the longest pit (11T). If the value of C is equal to or greater than 0.22 (≈0.224), therefore, signals with a sufficient quality are reproduced from a disk with a four-fold packing density.

Figure 10:
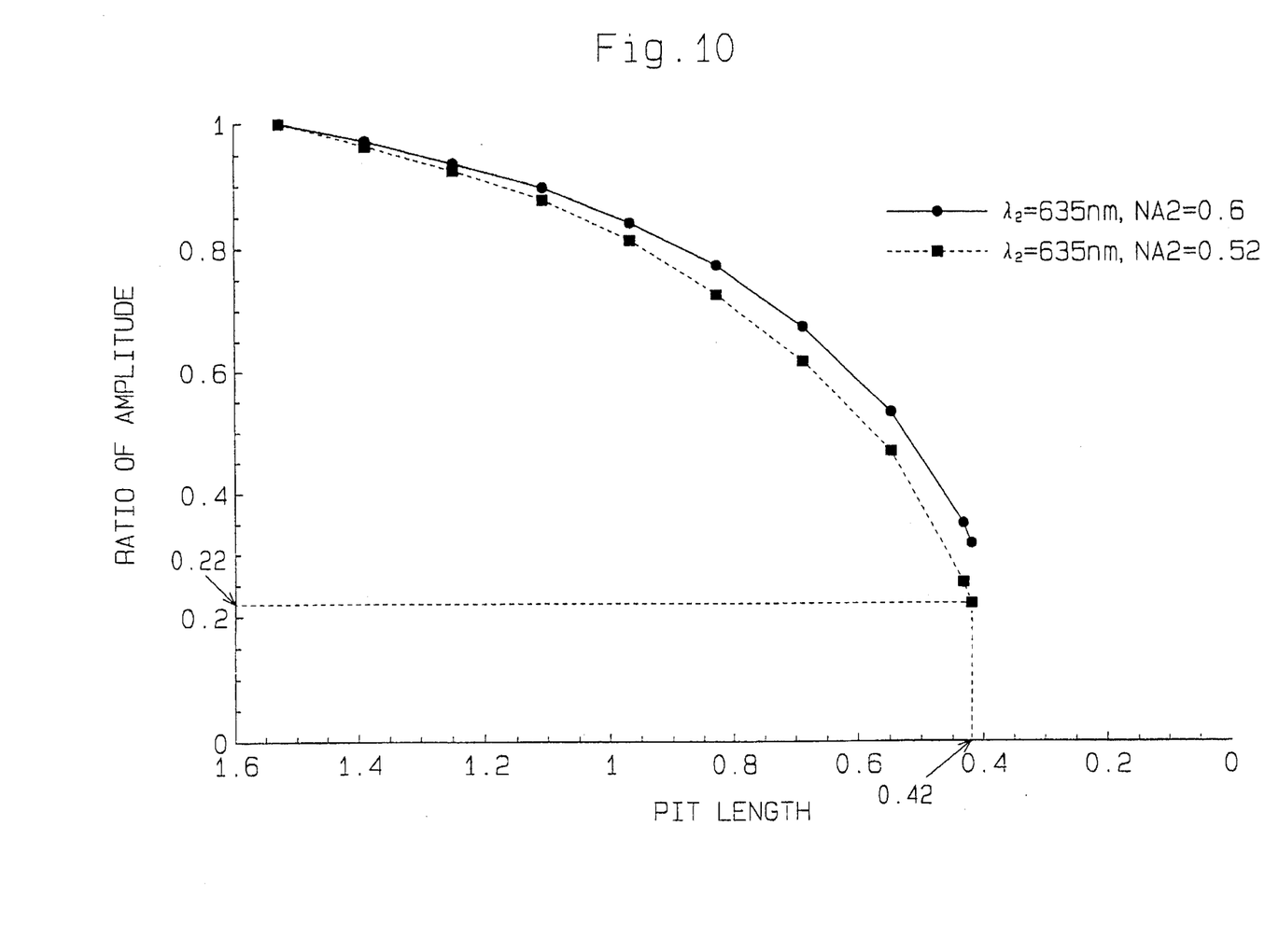
FIG. 10 is a graph of the relationship between the pit length and the ratio of amplitude of reproduced signals from the disk with a four-fold packing density.

FIG. 10 shows the relationship between the ratio of amplitude of reproduced signals and the pit length when signals are reproduced from a disk with a four-fold packing density using the pickup with λ2=635 nm and NA2=0.60 and the pickup with λ2=635 nm and NA2=0.52. The vertical scale in this graph represents the ratio of the amplitude of the reproduced signal from a predetermined pit to the amplitude of the reproduced signal from the longest pit, and the horizontal scale represents the pit length.

It is apparent from this graph that with λ2=635 nm and NA2=0.52, the amplitude of the reproduced signal from the shortest pit is 0.22 times the amplitude of the reproduced signal from the longest pit. The length of the shortest pit in this example is 0.42 μm, equal to the length of the shortest pit that is recorded at the recording linear velocity of 0.6 m/s. With λ2=635 nm and NA2=0.52, therefore, data can be properly reproduced from a disk with a four-fold packing density.

As described above, the pickup 1 of this embodiment has λ2 (=635 nm) and NA2 (=0.52) such that the C/N ratio of the reproduced signal from the shortest pit satisfies 50 dB when playing back a disk with a four-fold packing density. This pickup 1 can therefore reproduce signals with a sufficient quality from the disk with a four-fold packing density.

The converging spot size of the pickup with λ2=635 nm and NA2=0.52 is increased by about 15% as compared with the pickup with λ2=635 nm and NA2=0.6. Accordingly, at the time of playing back the disk with a four-fold packing density, the degree of reproducing modulation at the frequency f=fH=720 kHz for the pickup with λ2=635 nm and NA2=0.52 is reduced by about 10% as compared with the pickup with λ2=635 nm and NA2=0.6. By changing the constant of the equalizer 20 shown in FIG. 3 to alter the frequency characteristic of the reproduced signals, however, the reduction of the degree of reproducing modulation can be suppressed.

Since the system designed to have λ2=635 nm and NA2=0.6 secure the best reproduction characteristics for a disk with the ordinary packing density and a disk with a packing density four times greater than the ordinary packing density, the system requires an unillustrated mechanism for compensating for the inclination of the pickup and disk and an additional circuit (neither shown) for controlling this mechanism.

The system with NA2=0.52 is more advantageous over the system with NA2=0.6 from the viewpoint of the degree of additional coverage of the reproduction characteristic with respect to an error in the disk thickness and an error in the disk inclination. More specifically, the degree of additional coverage for the system with NA2=0.52 is improved by about 80% [(0.60/0.52)⁴=1.77] for the thickness error and improved by about 50% [(0.60/0.52)³=1.54] for the inclination error, as compared with that for the system with NA2=0.6. This can provide a margin for the productional error or variation in the thickness of disks whose packing density is four times the normal packing density and a margin for the inclination error or variation at the time the mechanisms are assembled together. The system with λ2=635 nm and NA2=0.52 can therefore ensure the best reproduction characteristic without any additional inclination-compensating mechanism and controller for this mechanism.

Apparent from FIG. 7, the condition according to the present invention is satisfied even when the value of NA2 is set to 0.55, which is between 0.52 and 0.60, with $\lambda 2=635$ nm. The degree of additional coverage for the system with NA2=0.55 is improved by about 40% [$(0.60/0.55)^4=1.42$] for the thickness error and improved by about 30% [$(0.60/0.55)^3=1.30$] for the inclination error, as compared with that for the system with NA2=0.6. The system with NA2=0.55 is less improved than the system with NA2=0.52, but is more improved than the system with NA2=0.60. The 40% of additional coverage for the thickness error is below the maximum permissible error in producing disks.

Although only two embodiments of the present invention have been described herein, it should be apparent to those skilled in the art that the present invention may be embodied in many other specific forms without departing from the spirit or scope of the invention. Particularly, it should be understood that the present invention may be embodied in the following forms.

The present invention may be applied to apparatuses designed to reproduce data from optical disks other compact disks, e.g., CD-ROMS or laser disks. The tracking servo of the pickup 1 may be of a threebeam type or a heterodyne type rather than the push-pull type. The structure of the pickup 1 may be modified to employ such type of tracking servo.

The pickup may be designed so that the wavelength $\lambda 2$ and numerical aperture NA2 satisfy only the equation: $(\lambda 2/NA2)<(\lambda 1/NA1)$. The pickup may also be designed so that the wavelength $\lambda 2$ and numerical aperture NA2 satisfy the aforementioned equations (10), (6), (9), (3), (4) and (5). Further, the pickup may be designed so that the wavelength $\lambda 2$ and numerical aperture NA2 satisfy the equation: $0.76\times \lambda 1<\lambda 2$, in addition to those mentioned equations.

With the wavelength $\lambda 1=780$ nm and the numerical aperture NA1=0.45, the value of the wavelength $\lambda 2$ for the numerical aperture NA2=0.6 may freely be changed within the range of 621 nm to 820 nm. With the wavelength $\lambda 2$ below 621 nm or above 820 nm, the conditions $I1\times I2\times I3 \geq 1$ and $I1\times I2\times I3 \leq 0.75$ cannot be satisfied. If those conditions are not met, it is not possible to suppress the reduction in the amplitude of a reproduced signal which is originated from the difference between the desired phase difference and the actual phase difference (i.e., the difference between the desired pit depth and the actual pit depth).

The value of the wavelength $\lambda 2$ with the numerical aperture NA2=0.52 may vary within the range of 593 nm to 830 nm as desired. With the wavelength $\lambda 2$ below 593 nm, the condition $0.76\times \lambda 1<\lambda 2$ cannot be met, disabling the acquisition of the tracking signal that becomes a detection signal at the time the push-pull type tracking servo is performed. With the wavelength $\lambda 2$ above 830 nm, the conditions $I1\times I2\times I3 \geq 1$ and $I1\times I2\times I3 \leq 0.75$ cannot be satisfied, so that the reduction in the amplitude of a reproduced signal cannot be suppressed.

Further, the value of the numerical aperture NA2 with the wavelength $\lambda 2=635$ nm may vary within the range of 0.52 to 0.60. The allowable variation range for the numerical aperture NA2 has a margin of ±0.01. For example, the allowable variation range for the numerical aperture NA2=0.60 is between 0.59 and 0.61. The allowable variation for NA2=0.52 is between 0.51 and 0.53, while the allowable variation for NA2=0.55 is between 0.54 and 0.56.

Therefore, the present examples and embodiment are to be considered as illustrative and not restrictive and the invention is not to be limited to the details given herein, but may be modified within the scope of the appended claims.

What is claimed is:

1. A laser apparatus for reproducing data recorded on a recording medium, the recording medium having a plurality of pits arranged thereon for storing digital data and being designed to be compatible with an information reproducing apparatus having a first lens with a first numerical aperture NA1 for focusing a first laser beam of a first wavelength $\lambda 1$ on the recording medium, the apparatus comprising:

a laser generator for generating a second laser beam of a second wavelength $\lambda 2$; and a second lens having a second numerical aperture NA2 for focusing said second laser beam from said laser generator, wherein said second wavelength $\lambda 2$ of said second laser beam and said second numerical aperture NA2 of said second lens are set to satisfy the relationship:

$$(\lambda 2/NA2)<(\lambda 1/NA1).$$

2. The apparatus according to claim 1, wherein said second wavelength $\lambda 2$ is greater than 0.76 times said first wavelength $\lambda 1$.

3. A laser apparatus for reproducing digital data recorded on a first recording medium, the first recording medium having a plurality of pits arranged thereon for storing digital data and being designed to be compatible with an information reproducing apparatus having a first lens with a first numerical aperture NA1 for focusing a first laser beam of a first wavelength $\lambda 1$ on the first recording medium, the apparatus comprising:

a laser generator for generating a second laser beam of a second wavelength $\lambda 2$; and a second lens having a second numerical aperture NA2 for focusing said second laser beam from said laser generator, wherein said second wavelength $\lambda 2$ of said second laser beam and said second numerical aperture NA2 of said second lens are set to satisfy the relationship $$I1\times I2\times I3 \geq 0.75$$

where I1 is a relative value, I2 is a reproduced amplitude value, and I3 is a reproduced amplitude value, which are given by the following equations:

$$I2=\sin^2[\pi/2\times(\lambda 2/NA2)/(\lambda 1/NA1)];$$

$$I3=[1-\cos^2(\pi/2\times 0.76\times \lambda 1/\lambda 2)]\times 1.16;$$

wherein when f is smaller than $(v\times NA1)/(2\times \lambda 1)$, $$I1=1;$$

wherein when f lies between $(v\times NA1)/(2\times \lambda 1)$ and $(v\times NA2)/(2\times \lambda 2)$, $$I1=3/\{2\times [2-(\lambda 1\times f)/(v\times NA1)]\};$$

and wherein when f is greater than $(v\times NA2)/(2\times \lambda 2)$, $$I1=[2-(\lambda 2\times f)/(v\times NA2)]/[2-(\lambda 1\times f)/(v\times NA1)]$$

where "v" is a linear velocity at which scanning with one of said first and second laser beams is carried out and "f" is a recording frequency.

4. The apparatus according to claim 3, wherein said second wavelength $\lambda 2$ is greater than 0.76 times said first wavelength $\lambda 1$.

5. The apparatus according to claim 3, wherein said recording frequency, f, lies between a lowest frequency fL and a highest frequency fH; and wherein when f is equal to fH, said wavelength λ2 and said numerical aperture NA2 are set to further satisfy the relationship:

$$I1 \times I2 \times I3 > 1.$$

6. The apparatus according to claim 3, wherein said wavelength λ2 and said numerical aperture NA2 are set to further satisfy the relationship:

$$(\lambda 2/NA2) < (\lambda 1/NA1);$$

and $$0.76 \times \lambda 1 < \lambda 2.$$

7. The apparatus according to claim 6, wherein said recording frequency, f, lies between a lowest frequency fL and a highest frequency fH; and wherein when f is equal to fH, said wavelength λ2 and said numerical aperture NA2 are set to further satisfy the relationship:

$$I1 \times I2 \times I3 \geq 1.$$

8. The apparatus according to claim 7, wherein said wavelength λ2 and said numerical aperture NA2 are set in such manner that at a time of reproducing digital data from a second recording medium having a higher packing density than that of said first recording medium, a ratio of a carrier wave to noise of a reproduced signal from a shortest pit on said second recording medium satisfies a minimum carrier-wave-to-noise ratio that allows acquisition of said reproduced signal with a sufficient quality.

9. The apparatus according to claim 7, wherein said first wavelength λ1 is set to 780 nm, and said first numerical aperture NA1 is set to 0.45; and wherein said second wavelength λ2 is set to 635 nm, and said second numerical aperture NA2 is set to 0.60.

10. The apparatus according to claim 7, wherein said first wavelength λ1 is set to 780 nm, and said first numerical aperture NA1 is set to 0.45; and wherein said second wavelength λ2 is set to 635 nm, and said second numerical aperture NA2 is set to 0.52.

11. The apparatus according to claim 7, wherein said first wavelength λ1 is set to 780 nm, and said first numerical aperture NA1 is set to 0.45; and wherein said second wavelength λ2 is set to 635 nm, and said second numerical aperture NA2 is set to 0.55.

12. The apparatus according to claim 7, wherein said second wavelength $\lambda_2$ ranges from 610 nm to 665 nm.

13. The apparatus according to claim 3, wherein said first recording medium is a compact disk.

14. The apparatus according to claim 3, wherein said first recording medium is a CD-ROM.

15. A method for reproducing digital data recorded on a recording medium, the recording medium having a plurality of pits arranged thereon for storing digital data and being designed to be compatible with an information reproducing apparatus having a first lens with a first numerical aperture NA1 for focusing a first laser beam of a first wavelength λ1 on the recording medium, the method comprising the steps of:

using a second laser beam having a second wavelength λ2;

using a second lens having a second numerical aperture NA2;

focusing said second laser beam of said second wavelength λ2 on the recording medium via said second lens; and producing a signal representative of the reproduced digital data in accordance with reflected light from said recording medium received via said second lens, wherein said second wavelength λ2 of said second laser beam and said second numerical aperture NA2 of said second lens are selected to satisfy the following equation:

$$I1 \times I2 \times I3 \geq 0.75$$

where I1 is a relative value, I2 is a reproduced amplitude value, and I3 is a reproduced amplitude value, which are given by the following equations:

$$I2 = \sin^2[\pi/2 \times (\lambda 2/NA2)/(\lambda 1/NA1)];$$

$$I3 = [1 - \cos^2(\pi/2 \times 0.76 \times \lambda 1/\lambda 2)] \times 1.16;$$

wherein when f is smaller than $(v \times NA1)/(2 \times \lambda 1)$, $$I1 = 1;$$

wherein when f lies between $(v \times NA1)/(2 \times \lambda 1)$ and $(v \times NA2)/(2 \times \lambda 2)$, $$I1 = 3/\{2 \times [2 - (\lambda 1 \times f)/(v \times NA1)]\};$$

and wherein when f is greater than $(v \times NA2)/(2 \times \lambda 2)$, $$I1 = [2 - (\lambda 2 \times f)/(v \times NA2)]/[2 - (\lambda 1 \times f)/(v \times NA1)]$$

where "v" is a linear velocity at which scanning with one of said first and second laser beams is carried out and "f" is a recording frequency.

16. The method according to claim 15, wherein said wavelength λ2 and said numerical aperture NA2 are selected to further satisfy the relationship:

$$(\lambda 2/NA2) < (\lambda 1/NA1),$$

and $$0.76 \times \lambda 1 < \lambda 2.$$

17. The method according to claim 15, wherein said recording frequency f lies between a lowest frequency fL and a highest frequency fH; and wherein when f is equal to fH, said wavelength λ2 and said numerical aperture NA2 are set to satisfy the relationship:

$$I1 \times I2 \times I3 > 1.$$

18. A laser apparatus for reproducing digital data recorded on a first recording medium, the first recording medium having a plurality of pits arranged thereon for storing digital data and being designed to be compatible with an information reproducing apparatus having a first lens with a first numerical aperture NA1 for focusing a first laser beam of a first wavelength λ1 on the first recording medium, wherein said first wavelength λ1 is set to 780 nm and wherein said first numerical aperture NA1 is set to 0.45, the apparatus comprising:

a laser generator for generating a second laser beam of a second wavelength λ2; and a second lens having a second numerical aperture NA2 for focusing said second laser beam from said laser generator, wherein said second wavelength λ2 of said second laser beam and said second numerical aperture NA2 of said second lens are set to satisfy the relationship:

$$I1 \times I2 \times I3 \geq 0.75$$

where I1 is a relative value, I2 is a reproduced amplitude value, and I3 is a reproduced amplitude value, which are given by the following equations:

$$I2 = \sin^2[\pi/2 \times (\lambda 2/NA2)/(\lambda 4/NA1)];$$

$$I3 = [1 - \cos^2(\pi/2 \times 0.76 \times \lambda 1/\lambda 2)] \times 1.16;$$

wherein when f is smaller than $(v \times NA1)/(2 \times \lambda 1)$, $I1=1$; wherein when f lies between $(v \times NA1)/(2 \times \lambda 1)$ and $(v \times NA2)/(2 \times \lambda 2)$, $$I1 = 3/\{2 \times [2 - (\lambda 1 \times f)/(v \times NA1)]\};$$

and wherein when f is greater than $(v \times NA2)/(2 \times \lambda 2)$, $$I1 = [2 - (\lambda 2 \times f)/(v \times NA2)]/[2 - (\lambda 1 \times f)/(v \times NA1)]$$

where "v" is a linear velocity of laser beam scanning and "f" is a recording frequency.

19. The apparatus according to claim 18, wherein said recording frequency, f, lies between a lowest frequency fL and a highest frequency fH; and wherein when f is equal to fH, said wavelength $\lambda 2$ and said numerical aperture NA2 are set to further satisfy the relationship:

$$I1 \times I2 \times I3 \geq 1.$$

20. The apparatus according to claim 18, wherein said wavelength $\lambda 2$ and said numerical aperture NA2 are set to further satisfy the relationship;

$$(\lambda 2/NA2) < (\lambda 1/NA1);$$

and $$0.76 \times \lambda 1 < \lambda 2.$$

21. The apparatus according to claim 20, wherein said recording frequency, f, lies between a lowest frequency fL and a highest frequency fH; and wherein f is equal to fH, said wavelength $\lambda 2$ and said numerical aperture NA2 are set to further satisfy the relationship:

$$I1 \times I2 \times I3 > 1.$$

22. The apparatus according to claim 21, wherein said wavelength $\lambda 2$ and said numerical aperture NA2 are set in such manner that at a time of reproducing digital data from a second recording medium having a higher packing density than that of said first recording medium, a ratio of a carrier wave to noise of a reproduced signal from a shortest pit on said second recording medium satisfies a minimum carrier-wave-to-noise ratio that allows acquisition of said reproduced signal with a sufficient quality.

23. The apparatus according to claim 21, wherein said second wavelength $\lambda 2$ is set to 635 nm, and said second numerical aperture NA2 is set to 0.60.

24. The apparatus according to claim 21, wherein said second wavelength $\lambda 2$ is set to 635 nm, and said second numerical aperture NA2 is set to 0.52.

25. The apparatus according to claim 21, wherein said second wavelength $\lambda 2$ is set to 635 nm, and said second numerical aperture NA2 is set to 0.55.

26. The apparatus according to claim 21, wherein said second wavelength $\lambda_2$ ranges from 610 nm to 665 nm.

27. The apparatus according to claim 18, wherein said second wavelength $\lambda 2$ is greater than 0.76 times said first wavelength $\lambda 1$.

28. A method for reproducing digital data recorded on a recording medium, the recording medium having a plurality of pits arranged thereon for storing digital data and being designed to be compatible with an information reproducing apparatus having a first lens with a first numerical aperture NA1 for focusing a first laser beam of a first wavelength $\lambda 1$ on the recording medium, wherein said first wavelength $\lambda 1$ is set to 780 nm and wherein said first numerical aperture NA1 is set to 0.45, the method comprising the steps of:

using a second laser beam having a second wavelength $\lambda 2$;

using a second lens having a second numerical aperture NA2;

focusing said second laser beam of said second wavelength $\lambda 2$ on the recording medium via said second lens; and producing a signal representative of the reproduced digital data in accordance with reflected light from said recording medium received via said second lens, wherein said second wavelength $\lambda 2$ of said second laser beam and said second numerical aperture NA2 of said second lens are selected to satisfy the following equation:

$$I2 = \sin^2[\pi/2 \times (\lambda 2/NA2)/(\lambda 1/NA1)];$$

$$I3 = [1 - \cos^2(\pi/2 \times 0.76 \times \lambda 1/\lambda 2)] \times 1.16;$$

wherein when f is smaller than $(v \times NA1)/(2 \times \lambda 1)$, $I1=1$; wherein when f lies between $(v \times NA1)/(2 \times \lambda 1)$ and $(v \times NA2)/(2 \times \lambda 2)$, $$I1 = 3/\{2 \times [2 - (\lambda 1 \times f)/(v \times NA1)]\};$$

and wherein when f is greater than $(v \times NA2)/(2 \times \lambda 2)$, $$I1 = [2 - (\lambda 2 \times f)/(v \times NA2)]/[2 - (\lambda 1 \times f)/(v \times NA1)]$$

where "v" is a linear velocity of laser beam scanning and "f" is a recording frequency.

29. The method according to claim 28, wherein said wavelength $\lambda 2$ and said numerical aperture NA2 are selected to further satisfy the relationship:

$$(\lambda 2/NA2) < (\lambda 1/NA1),$$

and $$0.76 \times \lambda 1 < \lambda 2.$$

30. The method according to claim 28, wherein said recording frequency f lies between a lowest frequency fL and a highest frequency fH; and wherein when f is equal to fH, said wavelength $\lambda 2$ and said numerical aperture NA2 are set to satisfy the relationship:

$$I1 \times I2 \times I3 \geq 1.$$

* * * * *

UNITED STATES PATENT AND TRADEMARK OFFICE
CERTIFICATE OF CORRECTION

PATENT NO. : 5,659,534
DATED : August 19, 1997
INVENTOR(S) : Terasaki et al.

It is certified that error appears in the above-identified patent and that said Letters Patent is hereby corrected as shown below:

On the title page, item [54] and column 1, line 2
correct the title of the patent by inserting the word --ON-- between the words "CONTAINED" and "DISKS".

Signed and Sealed this

Sixteenth Day of June, 1998

Attest:

BRUCE LEHMAN

*Attesting Officer*      *Commissioner of Patents and Trademarks*